INVENTORS.
THADDEUS F. BRYZINSKI
WILLIAM F. BARTLETT
BY
ATTORNEY

United States Patent Office 3,451,045

Patented June 17, 1969

3,451,045

DATA SEARCHING AND SORTING APPARATUS

William F. Bartlett, Rochester, and Thaddeus F. Bryzinski, West Webster, N.Y., assignors to Stromberg Carlson Corporation, Rochester, N.Y., a corporation of Delaware Filed Nov. 21, 1966, Ser. No. 595,968

Int. Cl. G11b *13/04;* G06f *7/06*

U.S. Cl. 340—172.5 5 Claims

ABSTRACT OF THE DISCLOSURE

An information retrieval system for locating serially recorded information on the basis of digital address signals. Signals representing the known parts of the desired address are inserted into a dynamic store having a time capacity less than the duration of a single digit of the address in the serially recorded medium. The dynamic store is operated with a repetitive time frame equal to its time capacity and divided into time slots equal in number to the total number of digits in any of the serially recorded addresses. Signals from the serially recorded addresses are fed through a scanning matrix to a coincidence circuit for comparison with the signals in the dynamic store. The scanning matrix is operated on a coincidence basis to transmit signals only during coincidence between respective time slots in the dynamic store and the corresponding digits in the serial medium.

Figure 1:
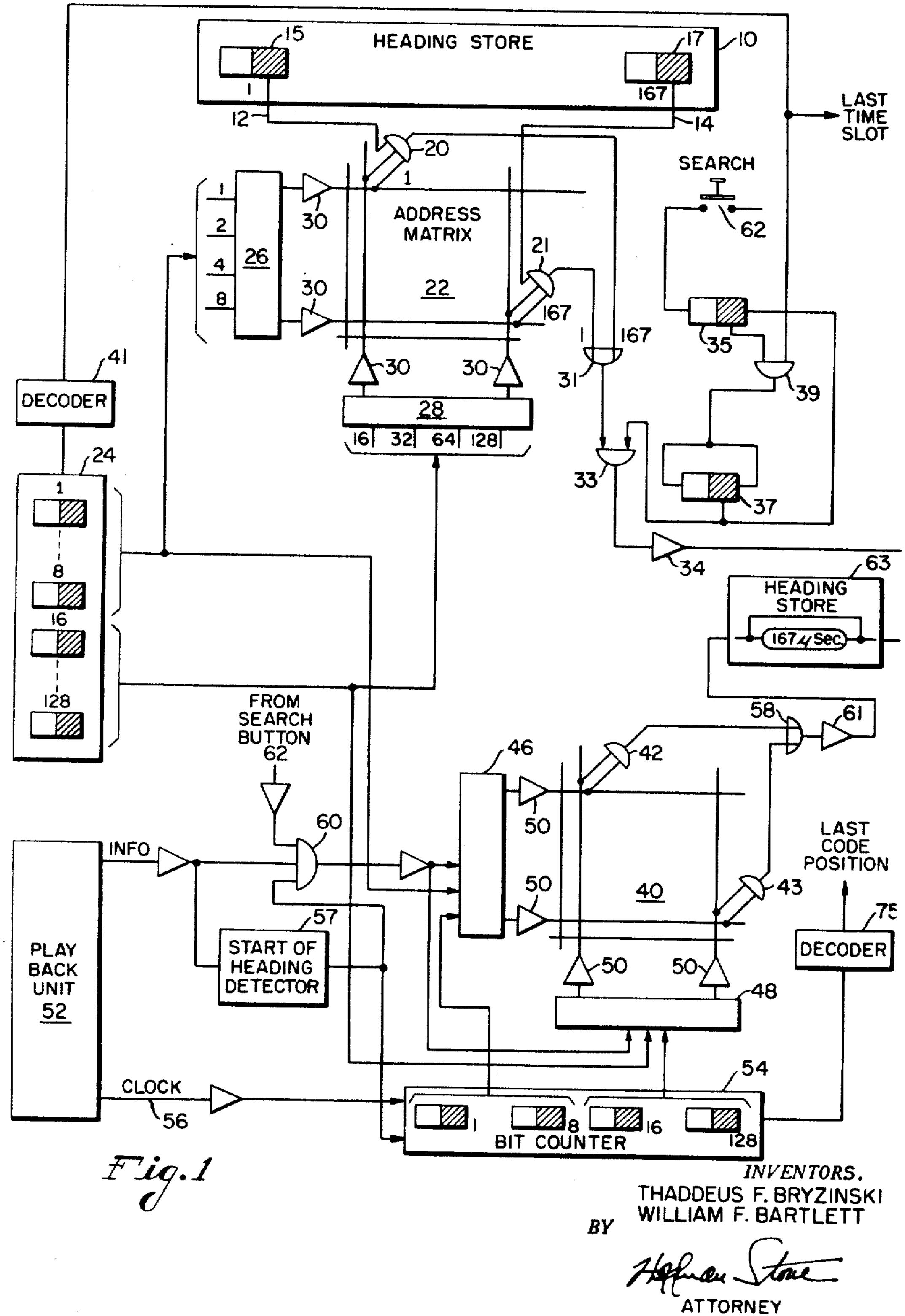

This invention relates to a novel electrical circuit arrangement for selecting desired data from a mass of data stored in a serially scannable medium, and, more particularly, to a novel circuit arrangement of the general type used for sorting groups of data signals in accordance with selected portions of each group called the address portions to select out of a series of groups only those groups that include predetermined bits of data in their addresses.

The invention arose in connection with the problem of finding and playing back telephone conference calls that had been recorded on magnetic tapes. Certain address information was recorded in coded form on the tapes immediately preceding each recorded conference. In the selection system described herein, it was desired to compare the address information for all of the previous recorded conferences with pre-selected address information that was known to be incomplete and to include less information than any of the recorded addresses. The coded address information was normally placed on the tape by an operator, and was not apt to be known in its entirety to, or remembered by any of the parties who participated in the conference call. In the system of the invention, any party having access to the system is enabled to enter signals representing parts of the address information known to, or recalled by him, whereupon the apparatus searches all of the recordings and selects those wherein the addresses include all of the signals entered by the party making the inquiry. The party may then listen briefly to the various recorded conferences, and is enabled very quickly to select the particular one that he is seeking.

In certain cases, the result of the search may be only a single recorded address. In other cases, several recorded addresses may be found, all of which include the entire incomplete address information, but in all cases the task of locating and then playing back a particular conference call is greatly simplified, because the circuit of the invention eliminates the need to scan all of the recorded conferences aurally.

Although the invention is described herein in connection with telephone conference recordings, it is not so limited. It is expected that the invention will find wide application in the general field of information handling, retrieval, and sorting.

A major feature of the invention concerns an arrangement for producing a series of time spaced signals arranged in respective time slots in a relatively short time frame responsively to a series of signals that are arranged in a relatively long time frame, which has the same number of time slots as the short one. Each of the time slots in the long time frame is longer than the entire duration of the short time frame. This permits the comparison circuit to operate under control of its own clock without the need to synchronize it with the record play-back system, and is of very great advantage in situations where it is desired simultaneously to search several recordings that are played back asynchronously.

Figure 2:
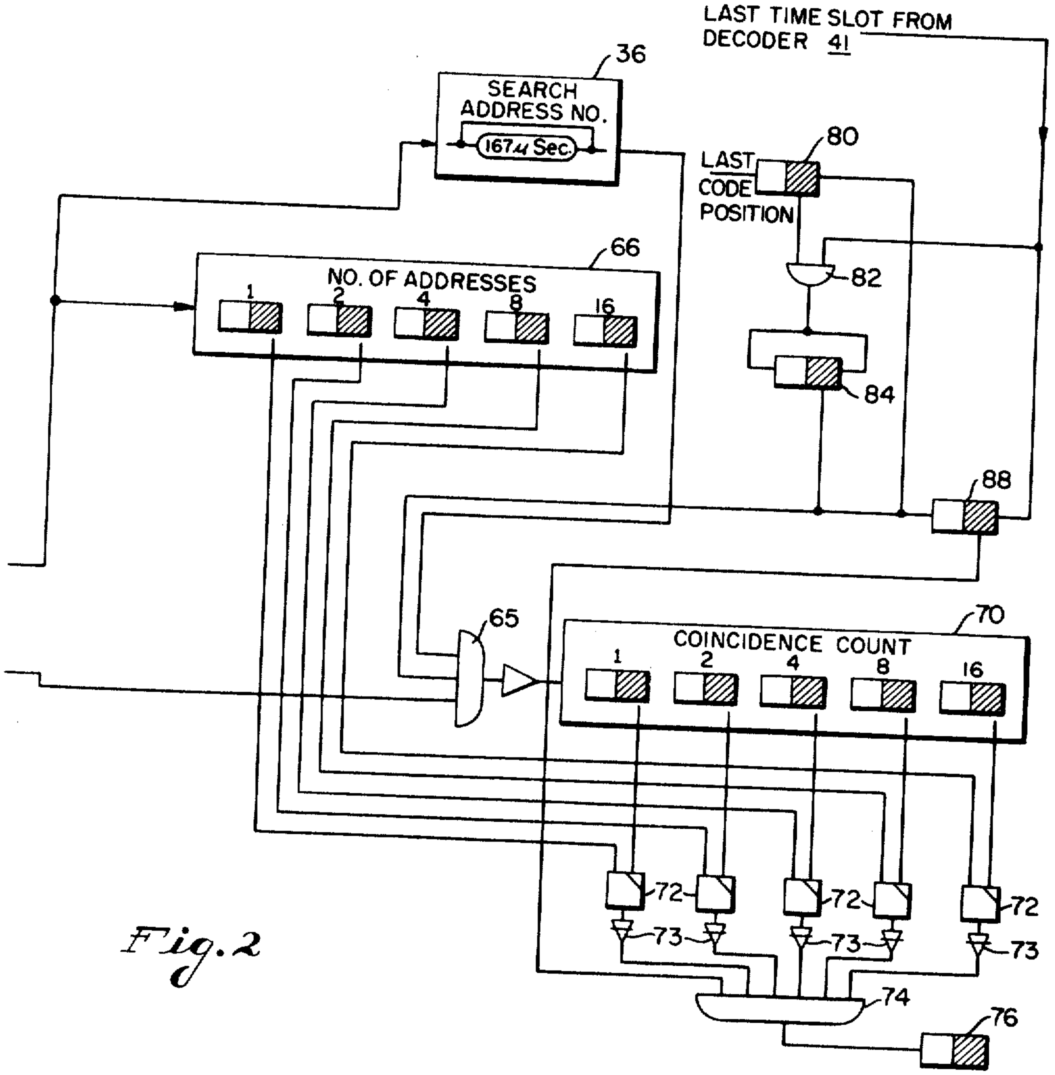
Figure 3:
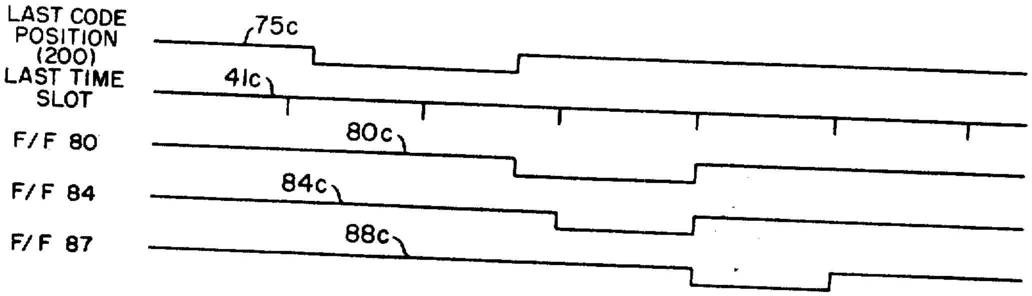

A presently preferred embodiment of the invention will now be described in connection with the drawings, wherein FIGURES 1 and 2, taken together and placed in juxtaposition, with FIGURE 2 placed to the right of FIGURE 1, constitute a block diagram of the circuit according to the presently preferred embodiment of the invention; and FIGURE 3 is a schematic timing diagram illustrating certain time relationships in the operation of the circuit.

Briefly, the circuit of the invention includes a dynamic storage device for storing the partial address data in the form of a series of electrical pulses in respective assigned time slots of a time frame, a scanning matrix controlled jointly by the generator of the time frame and by input signals played back from the record being searched, means for comparing the output of the scanning matrix with the content of the dynamic storage device, and means for producing an output signal after the comparison has covered all of the time slots of the frame and the scanning matrix has produced a pulse in each time slot wherein a pulse is stored in the storage device.

It is recognized that this type of comparison is of sufficient significance in only a limited number of utilizations, namely, those in which only a single pulse signal in each significant group of coded time positions is used to form the address headings. If more than a single pulse signal may be included in each significant group, a different type of comparison from the one described herein must be made to insure against the selection of unwanted addresses from the storage medium. It then becomes necessary to arrange matters so that the circuit makes a full coincidence comparison for all the time slots in each significant group that may include more than a single pulse signal. Such an arrangement will be well within the skill of those familiar with electrical data processing, and need not be described herein. The present invention is concerned primarily with producing signals in selected time slots of a time frame responsively to input signals that endure for at least one complete time frame but may be asynchronous with it.

The principles of the invention will be evident from a consideration of the simplified circuit shown in the drawing, where provision is made for searching only a single storage medium. First, an operator keys, by any desired means, the known partial address information into a static store 10, called the heading store, which has output terminals equal in number to the total number of code positions in the address code. In the example shown, 167 different code positions are provided. They may be organized in groups to indicate various different kinds of data included in the addres sought such as, for example, the identities of the parties who participated in the recorded conference, the priority level of the conference, its security classification, and the principal subject matter of the conference.

The store 10 may be constituted by a number of flip-flops 15 and 17 (only two of which are shown) equal to the number of terminals. When the individual flip-flops are set to indicate the presence of electrical pulses in certain code positions, they produce signals partially enabling respective AND gates 20 and 21 in a 10 x 17 scanning matrix 22. When the individual flip-flops 15 and 17 are not set, but are in the condition indicating the absence of a pulse signal, they maintain their respective terminals 12 and 14 at potentials such that their respective gates 20 and 21 are maintained disabled.

The scanning matrix 22 converts the space divided data in the static store 10 to time divided pulse signals for insertion into a dynamic store 36. The matrix 22 is driven by a binary coded decimal counter 24 through a pair of coordinately arranged decoders 26 and 28 respectively, and respective amplifiers 30. The counter 24 is operated at a relatively high rate such as, for example, one megacycle per second, such that its output partially enables each of the gates 20 and 21 in the matrix in timed sequence at least once during the interval occupied by a single code signal received from the storage medium.

The outputs of the gates 20 and 21 of the matrix are fed in sequence, and under control of a timing arrangement into a dynamic store 36, which may be (as shown) of the recirculating delay line type. The capacity of the store 36 is selected to be equal to the time frame required for scanning the matrix 22. For example, with the matrix being driven at one megacycle per second and including 167 gates 20 and 21, the entire matrix is sampled during an interval, referred to as the time frame of the system, of 167 microseconds. The dynamic store 36 then would have a capacity of 167 microseconds.

For reasons that will become apparent hereinafter in connection with the description of the comparison arrangement, it is desired to limit the output of the scanning counter to a single time frame only. The outputs of the gates 20 and 21 of the scanning matrix are commoned to an OR gate 31, the output of which is delivered to an AND gate 33, which is controlled to open for only a single time frame. This is accomplished in the arrangement shown by additional circuit means including a pair of flip-flops 35 and 37 and an AND gate 39 connected between them.

After the operator has keyed the partial data into the static store 10, he actuates a push-button 62 called the SEARCH button to instruct the circuit to start the search. The actuation of the SEARCH button produces a continuous signal which persists for the duration of the search. The leading edge of this SEARCH signal is applied to set the first flip-flop 35, the output of which now partially enables the auxiliary AND gate 39. The second input to the auxiliary AND gate 39 is taken from a decoder 41, which is fed from the counter 24 and produces an output signal indicating the end of one time frame and the start of the next succeeding one. At the end of the time frame next following actuation of the SEARCH button, the output of the flip-flop 35 passes through the gate 39 and sets the second flip-flop 37, the output of which now partially enables the AND gate 33. The next signal from the decoder 41 resets the second flip-flop 37, which in turn resets the first flip-flop 35. The gate 33 is enabled, therefore, for only a single time frame, the first complete time frame following actuation of the SEARCH button 62. The flip-flops 35 and 37 are locked in their rest condition until the next actuation of the SEARCH button.

The counter 24 also partially drives a second scanning matrix 40 generally similar to the first matrix 22 in that it is constituted by a coordinate array of 167 AND gates 42 and 43 in a 10 x 17 configuration. The output of the counter 24 is fed to respective units and decades decoders 46 and 48, respectively, the outputs of which are fed through amplifiers 50 to their respective gates. The decoders 46 and 48 receive signals also from the play-back device 52, and from a second binary coded decimal counter 54, called the bit counter, and do not produce output signals to enable the gates 42 and 43 in the absence of coincidence of signals from all three sources, that is, the first counter 24, the play-back device 52, and the second counter 54. The second counter 54 is driven by a clock signal derived from the record medium and taken from a separate terminal 56 of the play-back unit. It counts the successive pulse positions in the record medium. The counter 54 is reset and started by an output signal taken from a detector 57, which is arranged to produce a continuous output signal responsively to the occurrence of a START OF ADDRESS signal from the play-back unit 52. The continuous output signal from the detector 57 is fed also to an AND gate 60 partially to enable it. The signal from the play-back unit 52 also partially enables the AND gate 60. The third input to the AND gate 60 is from the SEARCH switch 62 under the operator's control. The signal from the play-back unit 52 reaches the decoders 46 and 48 only through the AND gate 60, and only following actuation of the SEARCH switch 62 and detection of a START OF ADDRESS signal by the detector 58.

When, now, the partial address information has been placed into the static store 10, the SEARCH switch 62 has been actuated, and the detector 58 has detected the occurrence of a START OF ADDRESS signal from the play-back unit 52, the second scanning matrix 40 can be driven. The high speed counter 24 provides partial driving signals to the matrix 40 at a rate to scan all 167 of the gates 42 and 43 during a period of 167 microseconds in the example given. The bit counter 54, under control of the clock signal from the terminal 56 of the play-back unit, produces output signals partially to enable the gates 42 and 43 in timed sequence in accordance with the occurrence of code pulse positions in the recording medium read by the play-back unit 52. Each of the signal pulses from the play-back unit 52 lasts longer than 167 microseconds. In one system for which the circuit of the present invention was especially designed, the signals would last typically about 200 microseconds, more or less. Each one of the gates 42 and 43 can produce an output signal only when it is selected by both of the counters 24 and 54, and then only if at that time, an output signal is being produced by the play-back unit 52. The high speed counter 24 synchronizes the operation of the matrix 40 with the 167 microsecond time frame of the system. The bit counter 54 synchronizes the operation of the matrix 40 with the clock of the record medium.

The outputs of the gates 42 and 43 are fed through a common OR gate 58 and an amplifier 61 to a dynamic store 63, which has the same capacity as the dynamic store 36 in which the partial address information is contained. The second dynamic store 63, however, receives a complete address including all of the address information for a particular conference on the record medium. It should be noted that it takes a relatively long time for the complete address information to be accumulated in the store 63 as compared to the single time frame required to place the partial information in the first dynamic store 36. The interval required for delivering the complete address information to the second store 63 is equal to the interval occupied by the information played back from the record medium.

It is now necessary only to compare the complete address in the second store 63 with the partial address in the first store 36. In the present embodiment, this is done by first counting the number of pulse signals included in the partial address information as delivered to the first dynamic store 36, and then comparing this count with a coincidence count produced by feeding the outputs of the two dynamic stores 36 and 63 through an AND gate 65.

If the counts agree, an output signal is produced indicating that all of the partial address information in the first dynamic store 36 is included in the particular full address in the record medium. Means (not shown) may readily be provided for stopping the record medium at this time and holding it pending review by the person seeking recall. If no output signal is produced, the play-back unit 52 continues to operate until the next address is reached. Typically, the play-back unit 52 operates at high speed for search purposes and at relatively slow speed for listening.

To produce the counts, the signal from the first matrix 22 is fed to a binary coded decimal counter 66 at the same time it is fed to the first recirculating store 36. This counter 66 is the reason that, as hereinabove described, the output of the first scanning matrix 22 is restricted to a single time frame. If more than one time frame were taken from the matrix 22, the count in the counter 66 would most likely be correct.

The second count, the one denoting the number of comparisons is produced by feeding the outputs of the two dynamic stores 36 and 63 simultaneously through an AND gate 65 into a second binary coded decimal counter 70. The outputs of the two counters 66 and 70 are then fed through a bank of EXCLUSIVE OR gates 72 each of which is followed by a respective invertor 73. The outputs of the invertors 73 are commoned to an AND gate 74 along with a LAST CODE POSITION signal derived from the bit counter 54 through a decoder 75.

If the counts in the two counters 66 and 70 agree, the invertors 73 all produce output signals fully to enable the AND gate 74 during the occurrence of the last code position in the address being searched. The output of the AND gate 74 is used to set a flip-flop 76, or in any other way to indicate that the circuit has found an address on the record medium that includes signals corresponding to all of the signals initially keyed into the static store 10. If the counts do not agree, no output signal is produced, and the equipment continues to scan the record medium until another START OF ADDRESS signal is detected by the detector 57, whereupon another comparison is made.

For similar considerations that required limiting the input to the first counter 36, the data from the two dynamic stores 36 and 63 is fed only once to the counter 70, which counts the number of comparisons, and the comparison of counts is made only after the coincidence count is completed. The timing diagram of FIGURE 3 illustrates the operation of this portion of the circuit.

In the circuit as illustrated, all pulse signals are regarded as negative going pulses relative to normal, or reference potentials at the terminals where the signals appear. Also, all of the flip-flops shown are of the type that set and re-set only in response to positive going changes in potential at their set and re-set terminals. A signal pulse, therefore, applied to a flip-flop causes the flip-flop to set or re-set only at the end of the pulse, not at its beginning.

The output signal from the decoder 75, which indicates the occurrence of the last code position in the record being scanned, is applied to set a first flip-flop 80 at the end of the address information on the record medium. Once set, the flip-flop 80 enables an AND gate 82, and holds it enabled until the flip-flop 80 is re-set. The output of the decoder 75 is shown schematically by the curve 75*c* in FIGURE 3, and the resulting output of the flip-flop 80 is shown by the curve 80*c*. After the flip-flop 80 is set, the next LAST TIME SLOT signal from the decoder 41 passes through the gate 82 and sets a second flip-flop 84, the output of which is indicated by the curve 84*c*, and is applied to one of the three inputs of the AND gate 65 at the input of the coincidence counter 70. During the succeeding time frame the counter 70 counts the number of coincident pulses in the two dynamic stores 36 and 63. At the end of the time frame, the next LAST TIME SLOT signal re-sets the second flip-flop 84. The output of the second flip-flop 84 is fed to the first flip-flop 80 to re-set it at the same time. The coincidence count is thus completed and limited to a single time frame.

It is then necessary to compare the two counts. This is done by reading the outputs of the EXCLUSIVE OR gates 72 after completion of both counts. For this purpose, the outputs of the EXCLUSIVE OR gates 72 are applied through the invertors 73, to an AND gate 74, one of the inputs of which is taken from a third flip-flop 88. The flip-flop 88 is set by the output of the second flip-flop 84 immediately upon completion of the coincidence count, and thereupon enables the AND gate 74 to produce an output signal if the two counts agree. The third flip-flop 88 need remain set only long enough to ensure transmission of the output signal through the AND gate 74 and setting of the output flip-flop 76 in response to it. Conveniently, however, the flip-flop 88 is allowed to remain set until the next LAST TIME SLOT signal from the decoder 41, which is applied to its reset terminal.

What is claimed is:

1. Apparatus for comparing two sets of electrical signals, both of which are in the form of time spaced pulses, the signals of the first set being assigned to respective time slots in a first time frame, the signals of the other set being assigned to respective time slots in a second time frame, both frames having the same number of time slots, and each time slot of the second frame occupying an interval at least equal to the duration of the first time frame, said apparatus comprising first and second dynamic stores each having a capacity equal to the first time frame, means for inserting signals of the first set into said first store, means for producing another set of signals in the first time frame in time slots therein corresponding to the time slots assigned to the second set of signals in the second time frame, means for inserting said other set of signals into said second store, and comparison means for comparing the content of said first store with the content of said second store.

2. Apparatus for comparing two sets of electrical signals, both of which are in the form of time spaced pulses, the signals of the first set being assigned to respective time slots in a first time frame, the signals of the other set being assigned to respective time slots in a second time frame, both frames having the same number of time slots, and each time slot of the second frame occupying an interval at least equal to the duration of the first time frame, said apparatus comprising first and second dynamic stores each having a capacity equal to the first time frame, means for inserting the first set of signals into said first store, gating means for sampling the second set of signals and producing another set of signals assigned to time slots in the first frame, said gating means being responsive to the time slots of both time frames and being arranged to produce said other signals in time slots of the first frame corresponding to the time slots of the second frame to which the second set of signals are assigned, means for inserting said other signals in said second store, and means for comparing the contents of said two stores.

3. Apparatus for comparing two sets of electrical signals, both of which are in the form of time spaced pulses, the signals of the first set being assigned to respective time slots in a first time frame, the signals of the other set being assigned to respective time slots in a second time frame, both frames having the same number of time slots, and each time slot of the second frame occupying an interval at least equal to the duration of the first frame, said apparatus comprising first and second dynamic stores each having a capacity equal to the first time frame, means for inserting the first set of signals into said first store, a matrix of AND gates equal in number to the number of time slots in the time frames, means applying the second set of signals to all of said gates, means for partially enabling a different respective one of said gates during successive time slots of the first frame, means for partially enabling corresponding different respective ones of said gates during corresponding successive time slots of the second frame, and means feeding the outputs of all of said gates to said second store, whereby there is accumulated in said second store a series of signals in the first time frame corresponding in time slot assignments to the second set of signals.

4. Apparatus in accordance with claim 3, including also comparison means for comparing the contents of said stores and producing an output signal if the second store contains signals assigned to each and every time slot to which a signal is assigned in said first store.

5. Apparatus in accordance with claim 3, wherein said dynamic stores are recirculating delay lines.

References Cited

UNITED STATES PATENTS

| | | | |
|---|---|---|---|
| 3,332,067 | 7/1967 | Bacon | 340—172.5 |
| 3,290,659 | 12/1966 | Fuller et al. | 340—172.5 |
| 3,235,845 | 2/1966 | Falkoff | 340—172.5 |
| 3,229,255 | 1/1966 | Anderson | 340—172.5 |
| 3,195,109 | 7/1965 | Behnke | 340—172.5 |
| 3,159,818 | 12/1964 | Scantlin | 340—172.5 |
| 3,042,902 | 7/1962 | Weida et al. | 340—172.5 |

GARETH D. SHAW, *Primary Examiner.*